United States Patent [19]

Yoshida

[11] Patent Number: 4,501,340
[45] Date of Patent: Feb. 26, 1985

[54] HYDRAULIC MASTER CYLINDER FOR A MOTORCYCLE, OR THE LIKE

[75] Inventor: Takao Yoshida, Saitama, Japan

[73] Assignee: Honda Giken Kogyo Kabushiki Kaisha, Tokyo, Japan

[21] Appl. No.: 419,296

[22] Filed: Sep. 17, 1982

[30] Foreign Application Priority Data

Sep. 19, 1981 [JP] Japan .............................. 56-148031

[51] Int. Cl.³ .............................................. B62K 23/02
[52] U.S. Cl. .................................. 180/219; 137/351; 188/344; 200/61.87
[58] Field of Search ............... 180/219; 280/289 H; 188/344; 74/551.8; 60/594; 200/61.87, 61.85; 137/899, 351

[56] References Cited

U.S. PATENT DOCUMENTS 2,271,273 1/1942 Mueller .............................. 188/344

FOREIGN PATENT DOCUMENTS 800196 8/1958 United Kingdom ............... 188/344

Primary Examiner—John A. Pekar
Attorney, Agent, or Firm—Sughrue, Mion, Zinn, Macpeak and Seas

[57] ABSTRACT

A hydraulic master cylinder for a motorcycle includes a body defining an oil reservoir therein which is mounted in an axially aligned relationship with the handlebar. The body may be formed separately from, or integrally with, the handlebar.

9 Claims, 11 Drawing Figures

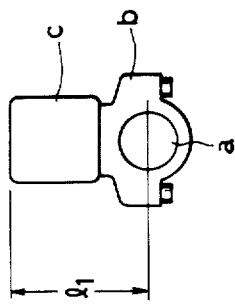
FIG. 1 PRIOR ART
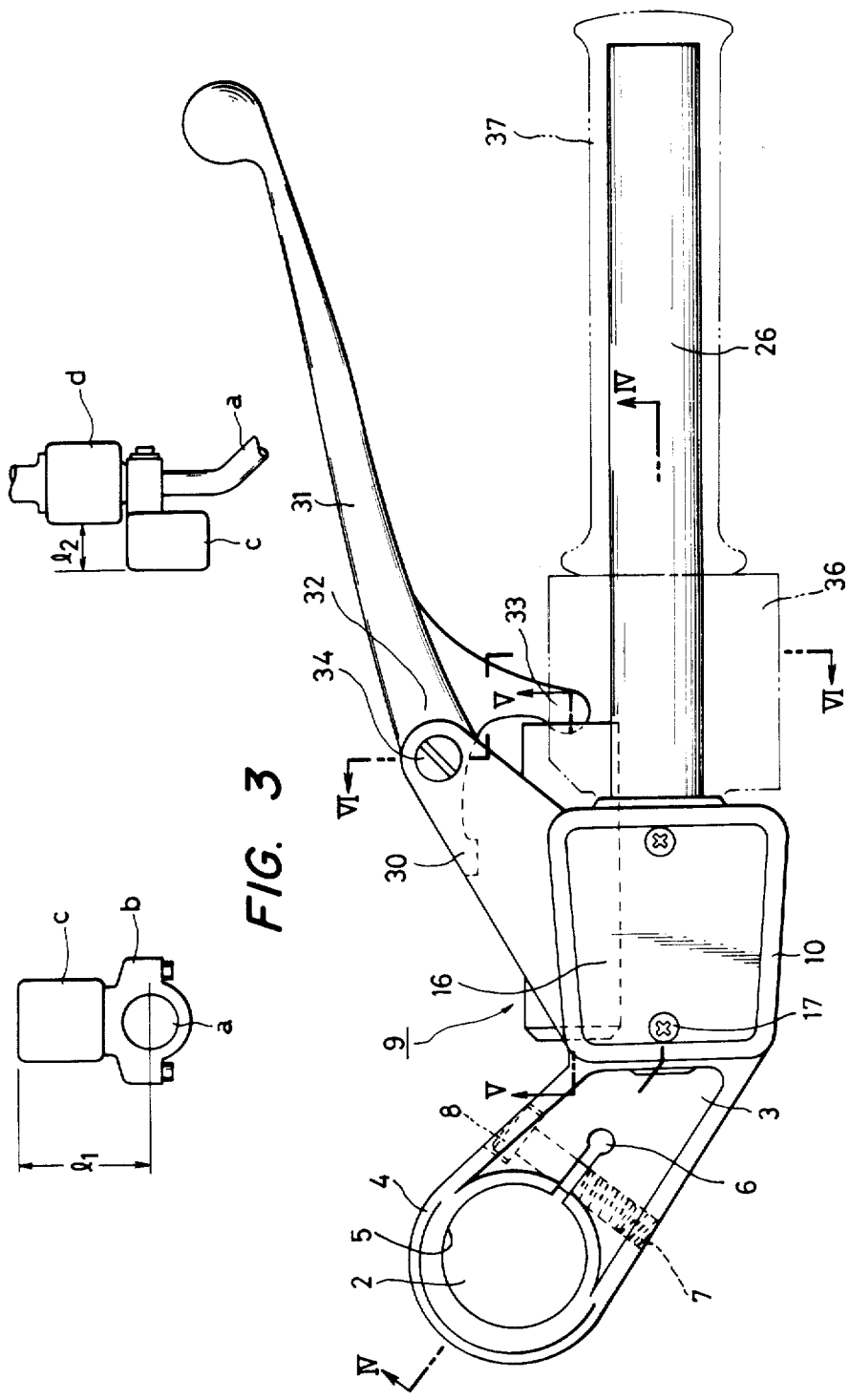
FIG. 2 PRIOR ART
FIG. 3

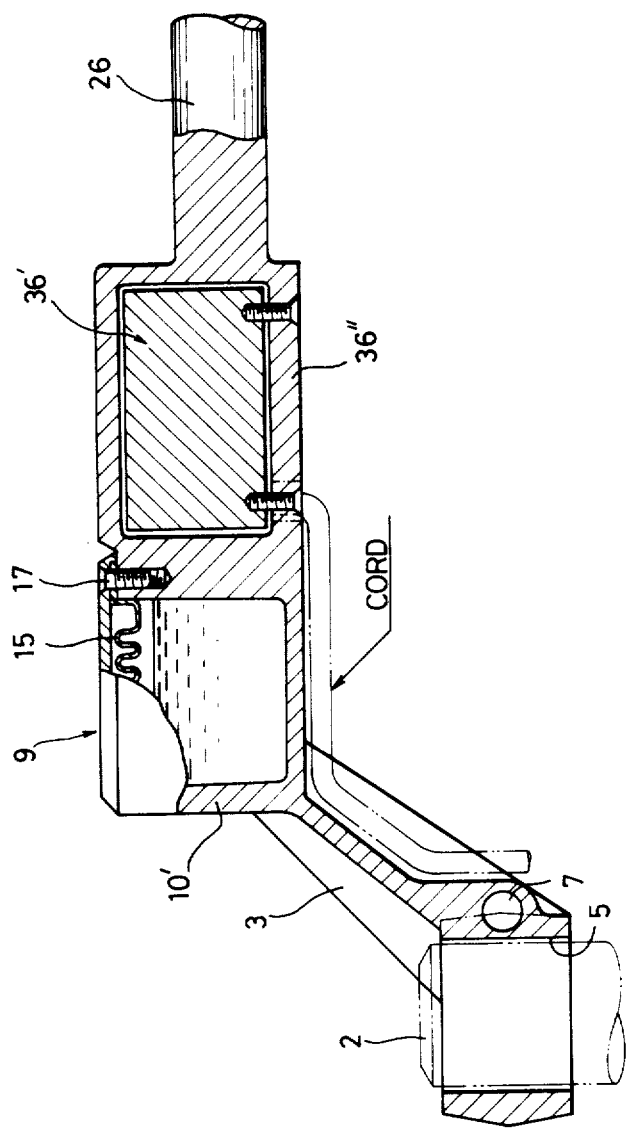

HYDRAULIC MASTER CYLINDER FOR A MOTORCYCLE, OR THE LIKE

BACKGROUND OF THE INVENTION

This invention relates to a motorcycle or other vehicle having a handlebar, and more particularly, to a hydraulic master cylinder, such as a brake or clutch master cylinder, mounted adjacent to the handlebar.

A hydraulic master cylinder having a piston adapted to be actuated by a lever provided adjacent to a handle grip has hitherto been positioned relative to the handlebar as shown in FIGS. 1 or 2. FIG. 1 shows the master cylinder c mounted on the handlebar a by a bracket b, while FIG. 2 shows the master cylinder c positioned alongside of the handlebar a, and a handle switching unit d mounted on the handlebar a coaxially therewith.

In either event, however, the master cylinder c must be sufficiently large to hold a satisfactorily large quantity of oil therein. As a result, the distance $l_1$ between the center of the handlebar a and the top of the master cylinder c is undersirably large in the arrangement shown in FIG. 1, and likewise, the distance $l_2$ between one side of the handle switching unit d and the far side of the master cylinder c is undersirably large in the arrangement of FIG. 2.

SUMMARY OF THE INVENTION

It is an object of this invention to eliminate the aforesaid drawbacks of the prior art, and provide a compact and inexpensive hydraulic master cylinder for a motorcycle, or the like.

BRIEF DESCRIPTION OF THE DRAWINGS

FIG. 1 is a front elevational view showing a conventional master cylinder relative to a handlebar;

FIG. 2 is a top plan view showing another conventional master cylinder relative to a handlebar;

FIG. 3 is a top plan view showing a hydraulic master cylinder for a motorcycle or the like embodying this invention;

FIG. 11 is a sectional view taken along the line XI—XI of FIG. 10.

DETAILED DESCRIPTION OF THE PREFERRED EMBODIMENTS

Figure 4:
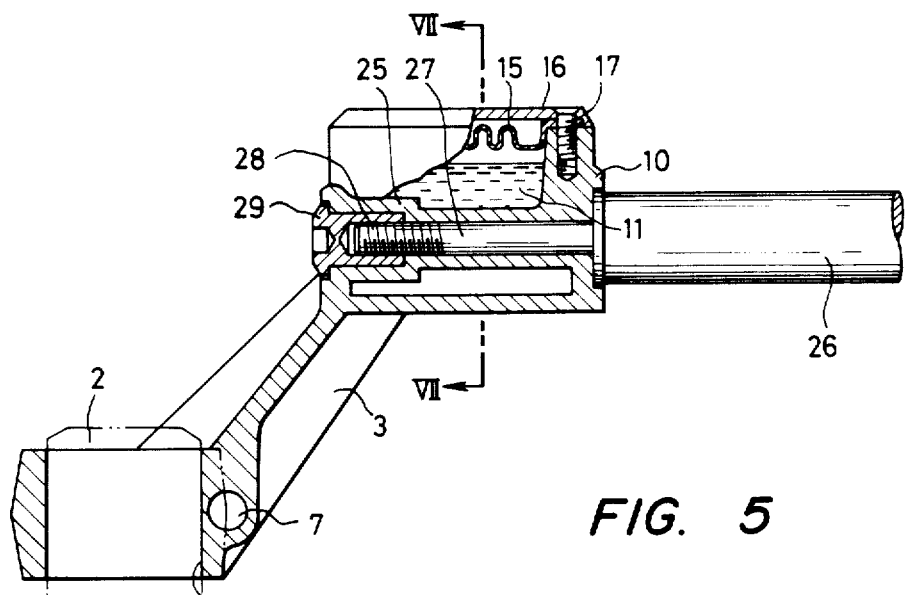
FIG. 4 is a sectional view taken along the line IV—IV of FIG. 3.

Referring first to FIGS. 3 to 7 of the drawings, there is shown a first embodiment of this invention. A motorcycle shown fragmentarily in FIG. 3 includes a pair of transversely spaced front forks of which only the right-hand one is shown at 1 in FIG. 4. The front fork 1 is secured integrally to a top bridge (not shown), and has a top 2 which projects above the top bridge. A handlebar bracket 3 has a base portion 4 provided with a hole 5 in which the top 2 of the front fork 1 is fitted. The bracket 3 has a slit 6 extending radially outwardly from the hole 5, and an elongated hole 7 which is perpendicular to the slit 6, and in which a bolt 8 is threadedly fitted.

A brake master cylinder 9 has a body 10 formed integrally with the bracket 3 by casting or forging. The body 10 has an upper portion which defines an oil reservoir 11, and a lower portion which defines a cylinder chamber 12 adjacent to the front end thereof. The reservoir 11 and the cylinder chamber 12 are fluidly connected with each other by ports 13 and 14. A cover 16 having a diaphragm 15 attached thereto is secured to the top of the body 10 by screws 17. The diaphragm 15 is vertically movable in accordance with changes in the quantity of oil in the reservoir 11 to maintain a constant pressure in the reservoir 11.

A master piston 18 is slidably positioned in the cylinder chamber 12. A return spring 20 is provided in the cylinder chamber 12 between the bottom thereof and the piston 18. A seal cap 19 is disposed between the piston 18 and the spring 20 to maintain oil tightness in the cylinder chamber 12. The piston 18 is provided intermediate the ends thereof with a radially outwardly projecting flange 22. A seal ring 23 is disposed inwardly of the flange 22 in contact with the piston and the peripheral wall of the cylinder chamber. A sealing boot 24 covers the outer end portion of the piston 18 outwardly of its flange 22.

A handlebar 26 is positioned on the opposite side of the body 10 from the bracket 3. The body 10 has a through hole 25 which extends coaxially with the handlebar 26. A nut 29 is fitted in the through hole 25 and its end remote from the handlebar 26. The handlebar 26 has a reduced diameter end portion 27 received in the hole 25. The portion 27 is externally threaded as indicated at 28, and threadedly received in the nut 29, whereby the handlebar 26 is secured to the body 10.

Figure 5:
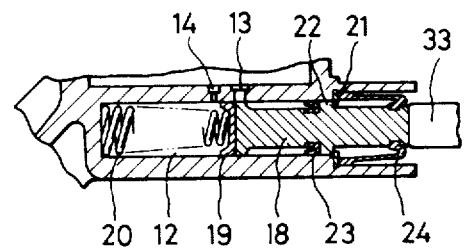
FIG. 5 is a sectional view taken along the line V—V of FIG. 3.
Figure 6:
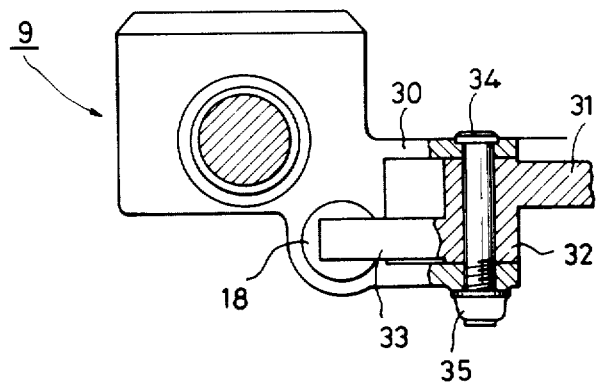
FIG. 6 is a sectional view taken along the line VI—VI of FIG. 3.
Figure 7:
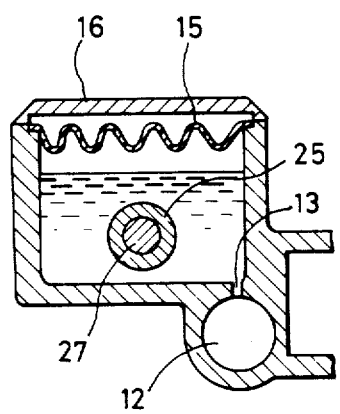
FIG. 7 is a sectional view taken along the line VII—VII of FIG. 4.

A bracket 30 is provided in front of the body 10, and forms an integral part thereof. A brake lever 31 has a base portion 32 which is rotatably connected to the bracket 30 by a bolt 34 and a nut 35. The lever 31 has a pressing leg 33 which projects from its base portion 32, and which is in abutment against the piston 18 (FIGS. 3, 5).

A handle switching unit 36, which contains a switch for turn signal and a starter switch, is mounted on the handlebar 26 adjacent to the master cylinder 9. A handle grip 37 is provided on the free end of the handlebar 26.

The port 13 (FIG. 5) defines a port through which oil is supplied from the reservoir 11 into the cylinder chamber 12. The port 14, which is provided adjacent to the port 13, defines a relief port which serves to equalize the pressure of the oil in the reservoir 11 and the pressure of the oil in the cylinder chamber 12.

Figure 8:
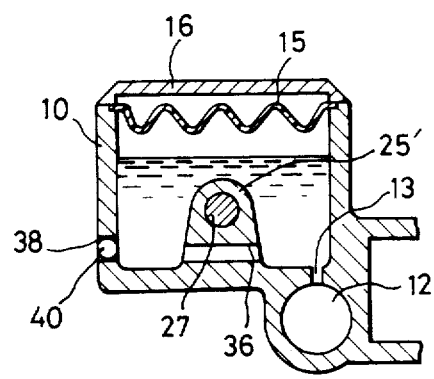
FIG. 8 is a view similar to FIG. 7, but showing a second embodiment of this invention.

A second embodiment of this invention is shown in FIG. 8. It is characterized by a bracket 25' projecting from the bottom of the body 10 into the oil reservoir, and defining a through hole in which the end portion 27 of the handlebar is received. The structure of FIG. 8 is easier to manufacture than that according to the first embodiment. The bracket 25' is provided with a bore 36 adjacent to the bottom of the reservoir, so that oil in a region on the opposite side of the bracket 25' from the cylinder chamber 12 may smoothly flow into the chamber 12. The bore 36 may be formed by a drill or like device inserted through the sidewall of the body 10. A hole 38 made in the sidewall for insertion of the drill or the like is closed by a ball seal 40.

Figure 9:
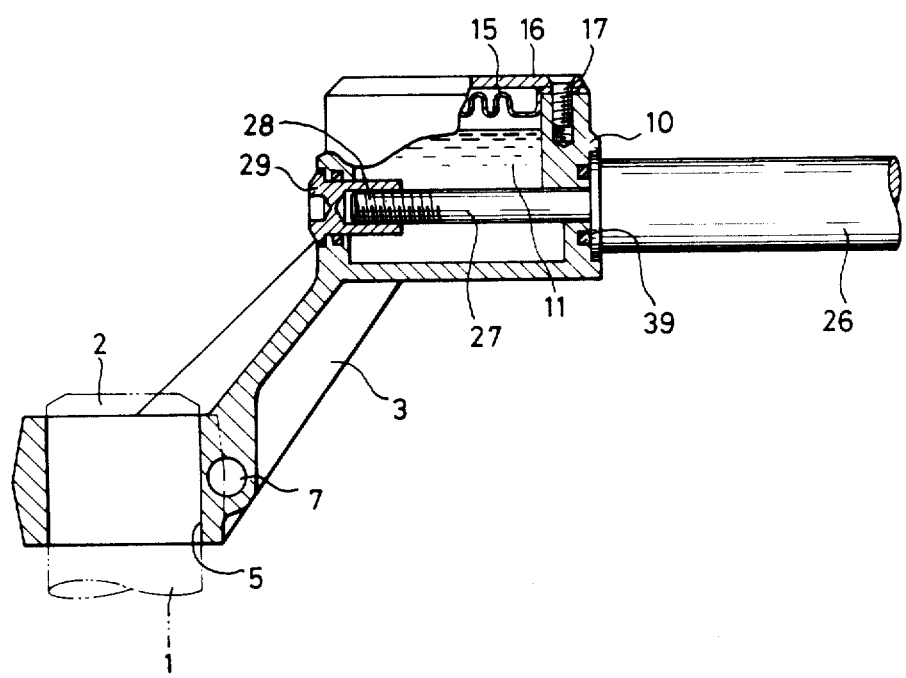
FIG. 9 is a sectional view showing a third embodiment of this invention.

A third embodiment of this invention is shown in FIG. 9, and is characterized by the elimination of the cylindrical wall 25 from the structure of the first embodiment (FIGS. 4, 7), or the bracket 25' from the structure of the second embodiment (FIG. 8). The end portion 27 of the handlebar 26 is supported merely by the nut 29, and the greater part of the end portion 27 is exposed to the oil in the reservoir 11. This arrangement gives the reservoir 11 an increased volume. The handlebar 26 is maintained in intimate contact with the body 10 by a seal ring 39. The seal ring 39 is radially outwardly spaced apart from the end portion 27 of the handlebar 26, so that it may not be deformed by the end portion 27 when the end portion 27 is inserted into the oil reservoir 11 during assembly.

Figure 10:
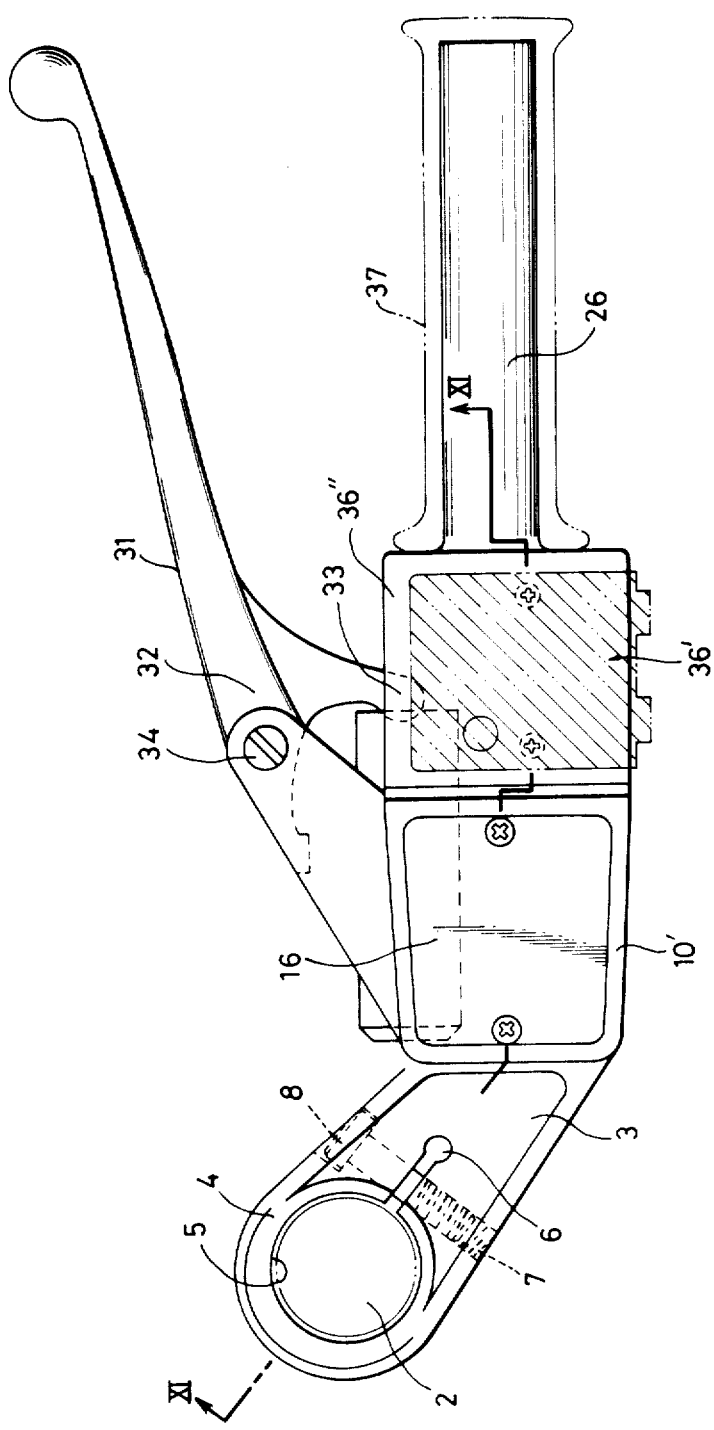
FIG. 10 is a top plan view showing a hydraulic master cylinder according to a fourth embodiment of this invention.

A fourth embodiment of this invention is shown in FIGS. 10 and 11, in which like parts and components are designated by the same reference numerals as those used in connection with the first embodiment. According to this embodiment, the handlebar 26 is provided integral with the body 10' of the oil reservoir and a handle switching unit 36'. The switch unit 36' is supported in a housing 36''. The housing 36'' serves as a damper for any abrupt shock transmitted from the handlebar, so that the master cylinder may function smoothly and reliably without being subjected to such shock.

In operation, the front fork 1 is rotated about a head pipe (not shown) if the handle grip 37 is moved. If the lever 31 is moved toward the handlebar, the piston 18 is pressed into the cylinder chamber 12 overcoming the force of the spring 20. If the seal cap 19 passes the relief port 14, compressed oil flows out of the chamber 12 through a port (not shown), and is supplied to a brake caliper (not shown) through a brake hose (not shown), whereby the brakes are actuated.

As the master cylinder 9 is formed integrally with the bracket 3 by casting or forging, it can be fabricated easily, reliably and inexpensively with a small number of parts. The master cylinder 9 is compact in construction, since it is axially aligned with the handlebar 26. According to some of the embodiments hereinabove described, the handlebar 26 is removable from the body 10 of the master cylinder 9 as its end 28 is threadedly received in the nut 29, and the master cylinder 9 is still more compact when the handlebar 26 is removed therefrom. According to the fourth embodiment, the handlebar 26 is formed integrally with the body of the master cylinder, while being separately formed according to the other embodiments hereinabove described. The structure according to the fourth embodiment is, therefore, easier to fabricate.

The hydraulic master cylinder of this invention is thus compact and simple in construction, and easy to fabricate, since it is connected to or formed integrally with a handlebar of a motorcycle or the like in axially aligned relationship therewith without being laterally spaced apart therefrom.

What is claimed is:

1. In a hydraulic master cylinder for a motorcycle having a handlebar and a handle grip mounted at an axially outside end portion of said handlebar, the improvement comprising a body defining an oil reservoir therein, said body being mounted at an axially inside end portion of said handlebar and in an axially aligned relationship with said handle grip, said body having a portion bulging radially outwardly with respect to said handlebar.

2. A master cylinder as set forth in claim 1, said body including a bracket surrounded at least partially by oil in said reservoir, and provided with a through hole for removably receiving an end portion of said handlebar, said body further including a nut in which said end portion is threadedly engageable.

3. A master cylinder as set forth in claim 2, wherein said bracket is surrounded by said oil along its entire circumference.

4. A master cylinder as set forth in claim 2, wherein said bracket is formed integrally with a wall of said body, and includes a bore which facilitates the flow of said oil from one side of said bracket to the other.

5. A master cylinder as set forth in claim 1, wherein said handlebar includes an end portion extending into said oil reservoir, said body including a nut in which said end portion is threadedly engaged, said end portion being exposed to oil in said reservoir along the greater part of the length thereof.

6. A master cylinder as set forth in claim 1, wherein said body is formed integrally with said handlebar.

7. A master cylinder as set forth in claim 1, further including a handlebar bracket fixed to a front fork of said motorcycle, said handlebar bracket being formed integrally with said body.

8. A master cylinder as set forth in claim 1, further including a bracket for mounting a brake lever, said bracket being formed integrally with said body.

9. A master cylinder as set forth in claim 1, further including a switching unit housing formed integrally with said handlebar and said body, and being located between the same in an axial direction thereof.

* * * * *